United States Patent
Kim et al.

(10) Patent No.: US 11,115,976 B2
(45) Date of Patent: Sep. 7, 2021

(54) METHOD FOR TRANSMITTING/RECEIVING UPLINK CONTROL CHANNEL IN FRAME STRUCTURE OF SHORT TRANSMISSION TIME INTERVAL AND DEVICE THEREFOR

(71) Applicant: KT CORPORATION, Gyeonggi-do (KR)

(72) Inventors: Ki-tae Kim, Seoul (KR); Kyujin Park, Seoul (KR); Woo-jin Choi, Seoul (KR)

(73) Assignee: KT CORPORATION, Seongnam-si (KR)

( * ) Notice: Subject to any disclaimer, the term of this patent is extended or adjusted under 35 U.S.C. 154(b) by 0 days.

(21) Appl. No.: 16/331,969

(22) PCT Filed: Aug. 11, 2017

(86) PCT No.: PCT/KR2017/008734
§ 371 (c)(1),
(2) Date: Mar. 9, 2019

(87) PCT Pub. No.: WO2018/048110
PCT Pub. Date: Mar. 15, 2018

(65) Prior Publication Data
US 2019/0230657 A1    Jul. 25, 2019

(30) Foreign Application Priority Data

Sep. 9, 2016 (KR) ............... 10-2016-0116784
Aug. 4, 2017 (KR) ............... 10-2017-0098820

(51) Int. Cl.
*H04L 12/28* (2006.01)
*H04W 72/04* (2009.01)
(Continued)

(52) U.S. Cl.
CPC ....... *H04W 72/0446* (2013.01); *H04L 5/0055* (2013.01); *H04W 72/042* (2013.01); *H04W 72/0413* (2013.01); *H04W 76/27* (2018.02)

(58) Field of Classification Search
None
See application file for complete search history.

(56) References Cited

U.S. PATENT DOCUMENTS

2016/0226639 A1    8/2016 Xiong et al.
2016/0249329 A1*   8/2016 Au ................... H05K 999/99
(Continued)

FOREIGN PATENT DOCUMENTS

KR    10-2017-0108202 A    9/2017
WO    2016/040290 A1       3/2016

OTHER PUBLICATIONS

Spreadtrum Communications, "HARQ feedback for sTTI scheduling", R1-164584, 3GPP TSG RAN WG1 Meeting #85, Nanjing, China, May 23-27, 2016, pp. 1-3.
(Continued)

*Primary Examiner* — Kwang B Yao
*Assistant Examiner* — Juvena W Loo
(74) *Attorney, Agent, or Firm* — Invenstone Patent, LLC

(57) ABSTRACT

Provided is a method and a device for transmitting an Ack/Nack of sPUCCH in response to the reception of short TTI-based sPDSCH in a 3GPP LTE/LTE-Advanced system. A base station may set, for each terminal, an offset value for setting a link between sPDSCH and sPUCCH, and transmit the set offset value to the terminal through upper layer signaling (RRC signaling), thereby enabling a terminal to use the offset value to allocate sPUCCH resources for transmitting an Ack/Nack in response to the reception of sPDSCH.

9 Claims, 11 Drawing Sheets

(51) Int. Cl.
*H04L 5/00* (2006.01)
*H04W 76/27* (2018.01)

(56) References Cited

U.S. PATENT DOCUMENTS

| | | | |
|---|---|---|---|
| 2017/0273071 A1* | 9/2017 | Nogami | H04W 72/0413 |
| 2017/0288819 A1* | 10/2017 | Chen | H04W 72/0446 |
| 2017/0290008 A1 | 10/2017 | Tooher et al. | |
| 2017/0332397 A1* | 11/2017 | Li | H04L 1/1887 |
| 2017/0338988 A1* | 11/2017 | Yin | H04L 5/0082 |
| 2018/0048451 A1* | 2/2018 | Yin | H04W 72/0446 |
| 2018/0076942 A1* | 3/2018 | Nory | H04W 52/346 |
| 2019/0173703 A1* | 6/2019 | Gao | H04W 72/0453 |
| 2019/0191429 A1* | 6/2019 | Stern-Berkowitz | H04W 72/0446 |
| 2019/0289586 A1* | 9/2019 | Ouchi | H04L 27/2602 |
| 2019/0335489 A1* | 10/2019 | Oh | H04W 72/0446 |
| 2019/0342864 A1* | 11/2019 | Hwang | H04W 88/02 |

OTHER PUBLICATIONS

Huawei et al., "Short TTI for DL transmissions", R1-160292, 3GPP TSG RAN WG1 Meeting #84, St Julian's, Malta, Feb. 15-19, 2016, pp. 1-7.

LG Electronics et al., "WF on PUCCH resource allocation for shortened processing time for 1ms TTI", R1-168232, 3GPP TSG RAN1 #86, Gothenburg, Sweden, Aug. 22-26, 2016, pp. 1-4.

ZTE Corp. et al., "HARQ with shortened processing time for 1ms TTI", R1-167577, 3GPP TSG RAN WG1 Meeting #86, Gothenburg, Sweden, Aug. 22-26, 2016, pp. 1-9.

Ericsson, "Processing time reduction in DL", R1-160930, 3GPP TSG RAN WG1 Meeting #84, Malta, Feb. 15-19, 2016, pp. 1-3.

Ericsson, "Physical layer aspects of short PUCCH", R1-160936, 3GPP TSG RAN WG1 Meeting #84, Malta, Feb. 15-19, 2016, pp. 1-4.

* cited by examiner

Normal CP case

METHOD FOR TRANSMITTING/RECEIVING UPLINK CONTROL CHANNEL IN FRAME STRUCTURE OF SHORT TRANSMISSION TIME INTERVAL AND DEVICE THEREFOR

CROSS REFERENCE TO RELATED APPLICATIONS

This application is a National Stage Patent Application of PCT International Patent Application No. PCT/KR2017/008734 (filed on Aug. 11, 2017) under 35 U.S.C. § 371, which claims priority to Korean Patent Application Nos. 10-2016-0116784 (filed on Sep. 9, 2016) and 10-2017-0098820 (filed on Aug. 4, 2017), the teachings of which are incorporated herein in their entireties by reference.

TECHNICAL FIELD

The present disclosure relates to a method of transmitting and receiving an uplink control channel based on a short transmission time interval frame structure in the 3rd generation partnership project (3GPP) long term evolution (LTE)/LTE-A system.

BACKGROUND ART

Study and discussion have been in progress for reducing latency when data are transmitted and received in mobile communication systems. To reduce latency and improve data throughput, a frame having a short Transmission Time Interval (hereinafter referred to as "short TTI" or "sTTI") and operation thereof have been standardized.

Such an sTTI frame structure has the typical LTE/LTE-Advanced frame structure. For example, the sTTI frame is configured on per 2, 4, or 7 symbol basis in TTI=1 ms=14 OFDM symbols, and data is transmitted or received based on the sTTI frame structure. Accordingly, latency can be reduced, and data throughput can be improved.

As described, the sTTI frame may be configured with 2, 4, or 7 symbols, and an uplink frame structure may be configured with different from a downlink frame structure. Since the uplink frame structure is different from the downlink frame structure, there is a conflict problem when an uplink control channel is transmitted for a downlink data channel.

DETAILED DESCRIPTION OF THE INVENTION

Technical Problem

It is an object of the present disclosure to provide a method of establishing a linkage of an uplink control channel in response to a downlink data channel in a short transmission time interval frame structure.

It is another object of the present disclosure to provide a method of transmitting/receiving an uplink control channel while preventing a conflict of transmission resources when an uplink control channel is transmitted in response to a downlink data channel in a short transmission time interval frame structure.

Technical Solution

An aspect of the present disclosure is to provide a method of transmitting an uplink control channel in a short transmission time interval frame structure. The method may include receiving a downlink data channel through a short transmission time interval frame from a base station, receiving an offset value set for each user equipment through higher layer signaling in order to transmit the uplink control channel in response to the downlink data channel, and transmitting the uplink control channel through a resource determined based on the offset value.

Another aspect of the present disclosure is to provide a method of receiving an uplink control channel in a short transmission time interval frame structure. The method may include transmitting a downlink data channel through a short transmission time interval frame to a user equipment, transmitting an offset value set for each user equipment through higher layer signaling in order to transmit the uplink control channel in response to the downlink data channel, and receiving the uplink control channel through a resource determined based on the offset value.

Further another aspect of the present disclosure is to provide a user equipment transmitting an uplink control channel in a short transmission time interval frame structure. The user equipment may include a receiver configured to receive a downlink data channel through a short transmission time interval frame from a base station, receive an offset value set for each user equipment through higher layer signaling in order to transmit the uplink control channel in response to the downlink data channel, and a controller configured to transmit the uplink control channel through a resource determined based on the offset value.

Yet another aspect of the present disclosure is to provide a base station receiving an uplink control channel in a short transmission time interval frame structure. The base station may include a controller configured to transmit a downlink data channel through a short transmission time interval frame to a user equipment, transmit an offset value set for each user equipment through higher layer signaling in order to transmit the uplink control channel in response to the downlink data channel, and a receiver configured to receive the uplink control channel through a resource determined based on the offset value.

Effects of the Invention

In accordance with some embodiments of the present disclosure, provided is a method of configuring an uplink control channel resource for a downlink data channel in a short transmission time interval frame structure.

In accordance with some embodiments of the present disclosure, by signaling to a user equipment an offset value for configuring an uplink control channel resource for a downlink data channel in a short transmission time interval frame structure, the uplink control channel can be transmitted without overlapping of resources for uplink control channel transmission.

BEST MODE FOR CARRYING OUT THE INVENTION

Figure 1:
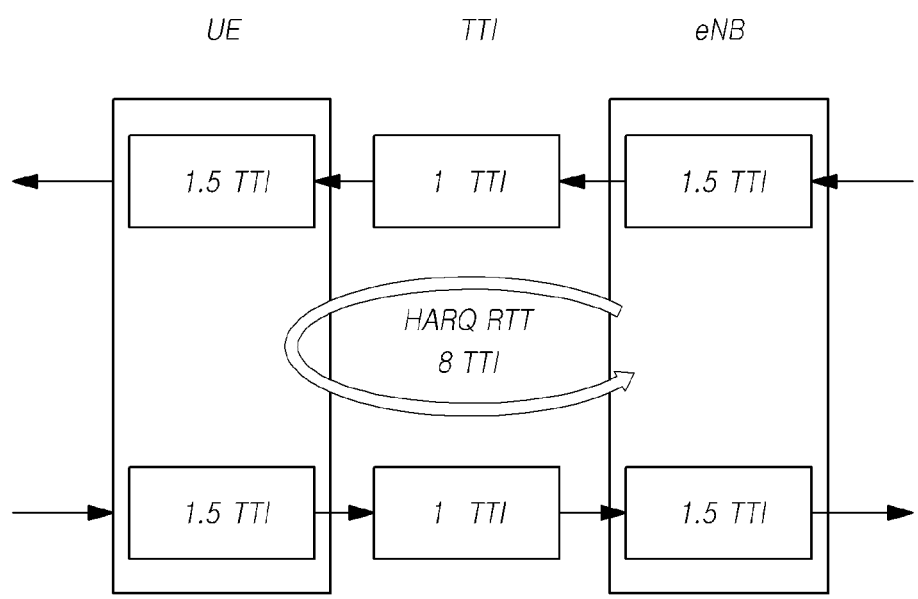
FIG. 1 is a diagram illustrating eNB and UE processing delays and HARQ RTT.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

A machine type communication (MTC) device in the present specification may refer to a device supporting low cost (or low complexity), a device supporting coverage enhancement, or the like. The MTC device in the present specification may refer to a device that supports low cost (or low complexity) and coverage enhancement, or the like. The MTC device in the present specification may refer to a device defined in a predetermined category for supporting low cost (or low complexity) and/or coverage enhancement.

In other words, the MTC device in the present specification may refer to a low cost (or low complexity) user equipment (UE) category/type newly defined in 3GPP Release-13 and performing LTE-based MTC-related operations. As another example, the MTC device in the present specification may refer to a UE category/type defined in or before 3GPP Release-12, which supports enhanced coverage in comparison with the typical LTE coverage or supports low power consumption, or may refer to a low. cost (or low complexity) UE category/type newly defined in Release-13.

A wireless communication system of the present disclosure is widely installed to provide various communication services, such as a voice communication service, a packet data service, etc. The wireless communication system includes a user equipment (UE) and a base station (BS, or eNB). The UE in the present specification is defined as a generic term including terminals used in wireless communication. The UE includes UEs in wideband code division multiple access (WCDMA), LTE, high speed packet access (HSPA), and the like, a mobile station (MS) in global systems for mobile communication (GSM), a user terminal (UT), a subscriber station (SS), a wireless device, or the like.

A BS or a cell generally refers to a station communicating with the UE. The BS or the cell may be referred to as a Node-B, an evolved Node-B (eNB), a sector, a site, a base transceiver system (BTS), an access point, a relay node, a remote radio head (RRH), a radio unit (RU), a small cell, or the like.

That is, the BS or the cell in the present specification is defined as a generic term including some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Since each of the above-described various cells is controlled by a BS, therefore the BS may be classified into two categories. The BS may be referred to i) an apparatus that provides a megacell, a macrocell, a microcell, a picocell, a femtocell, or a small cell, in association with a radio area, or ii) the radio area itself. In i), the BS may be referred to all apparatuses providing any radio area, which are controlled by the same entity, or which interact to configure the radio area in cooperation with one another. According to a method of establishing a radio area, an example of the BS may be an eNB, a RRH, an antenna, a RU, a low power node (LPN), a point, a transmission/reception point, a transmission point, a reception point, or the like. In ii), the BS may be a radio area itself for receiving or transmitting a signal from UE perspective or neighboring BS perspective.

Accordingly, the megacell, the macrocell, the microcell, the picocell, the femtocell, or the small cell, the RRH, the antenna, the RU, the LPN, the point, the eNB, the transmission/reception point, the transmission point, or the reception point are collectively referred to as the BS.

The UE and the BS in the present specification are two entities for performing transmission/reception used to embody the technology and technical spirit described in the present specification. The UE and the BS are defined as a generic term and not limited to specific terms or words. The UE and the BS are two entities for performing transmission/reception through uplink or downlink used to embody the technology and technical spirit described in the present disclosure. The UE and the BS are defined as a generic term and not limited to specific terms or words. The uplink (UL) refers to a scheme transmitting/receiving data by a UE to/from a BS, and the downlink (DL) refers to a scheme transmitting/receiving data by a BS to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. At least one embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not limited to or shall not be construed to be limited to a particular wireless communication field, and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, in some systems such as the LTE or LTE-advanced, a standard defines that the UL and the DL is configured based on a single carrier or a pair of carriers. The UL and the DL may be established by one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like, through which control information is transmitted, and may be established by one or more data channels, such as a physical DL shared channel (PDSCH), a physical UL shared channel (PUSCH), or the like, through which data are transmitted.

Meanwhile, control information may be transmitted through an enhanced PDCCH (EPDCCH) or extended PDCCH (EPDCCH).

The cell in the present specification may refer to a coverage of a signal transmitted from a transmission point or a transmission/reception point, a component carrier having the coverage of the signal transmitted from the transmission point or the transmission/reception point, or the transmission/reception point itself.

A wireless communication system to which some embodiments are applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be at least one RRH that is connected to a BS or macrocell (hereinafter, referred to as 'eNB') through an optical cable or an optical fiber and thereby controlled in a wired manner, and that has high transmission power or low transmission power in a macrocell area.

Hereinafter, the DL denotes communication or a communication path from multiple transmission/reception points to a UE. The UL denotes communication or a communication path from the UE to the multiple transmission/reception points. In the DL, a transmitter may be a part of multiple transmission/reception points, and a receiver may be a part of the UE. In the UL, a transmitter may be a part of the UE and a receiver may be a part of multiple transmission/reception points.

Hereinafter, signal transmission or reception through PUCCH, PUSCH, PDCCH, EPDCCH, or PDSCH may be referred to as transmission and reception of PUCCH, PUSCH, PDCCH, EPDCCH or PDSCH.

In addition, hereinafter, a description of transmitting or receiving a PDCCH or a description of transmitting or receiving a signal through the PDCCH may include i) meaning of transmitting or receiving an EPDCCH or ii) meaning of transmitting or receiving a signal through the EPDCCH.

That is, a physical DL control channel described below may denote a PDCCH or an EPDCCH, or the physical DL control channel is also used as meaning including both the PDCCH and the EPDCCH.

Also, for convenience of description, an EPDCCH may be applied to an embodiment described with the PDCCH, as an embodiment of the present disclosure, and the PDCCH may be also applied to an embodiment described with the EPDCCH.

Meanwhile, higher layer signaling described below includes radio resource control (RRC) signaling for transmitting RRC information containing an RRC parameter.

The eNB performs DL transmission to UEs. The eNB may transmit a physical DL shared channel (PDSCH) which is a primary physical channel for unicast transmission. The eNB may also transmit a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmission/reception of a signal through each channel will be described as transmission/reception of the corresponding channel.

[Latency Reduction in RAN1]

Latency reduction Study Item has been approved at the RAN plenary #69 meeting. The main purpose of latency reduction is to standardize a short TTI operation to improve TCP throughput. To this end, performance verification for the short TTI has already been performed in RAN2 [2].

Potential impacts and studies related to RAN1 are performed in the following ranges [1]:

Assess specification impact and study feasibility and performance of TTI lengths between 0.5 ms and one OFDM symbol, taking into account impact on reference signals and physical layer control signaling backwards compatibility shall be preserved (thus allowing normal operation of pre-Rel 13 UEs on the same carrier); and Latency reduction can be achieved by the following physical layer techniques:

short TTI reduced processing time in implementation new frame structure of TDD

Additional agreements at the 3GPP RAN WG1 #84 meeting are as follows.

Agreements:

Following design assumptions are considered:

No shortened TTI spans over subframe boundary

At least for SIBs and paging, PDCCH and legacy PDSCH are used for scheduling

The potential specific impacts for the followings are studied

UE is expected to receive a sPDSCH at least for downlink unicast sPDSCH refers PDSCH carrying data in a short TTI UE is expected to receive PDSCH for downlink unicast FFS whether a UE is expected to receive both sPDSCH and PDSCH for downlink unicast simultaneously FFS: The number of supported short TTIs If the number of supported short TTIs is more than one, Agreements:

Following design assumptions are used for the study

From eNB perspective, existing non-sTTI and sTTI can be FDMed in the same subframe in the same carrier FFS: Other multiplexing method(s) with existing non-sTTI for UE supporting latency reduction features Agreements:

In this study, following aspects are assumed in RAN1.

PSS/SSS, PBCH, PCFICH and PRACH, Random access, SIB and Paging procedures are not modified.

Following aspects are further studied in the next RAN1 meeting

Note: But the study is not limited to them.

Design of sPUSCH DM-RS

Alt.1: DM-RS symbol shared by multiple short-TTIs within the same subframe

Alt.1: DM-RS contained in each sPUSCH

HARQ for sPUSCH

Whether/how to realize asynchronous and/or synchronous HARQ sTTI operation for Pcell and/or Scells by (e)CA in addition to non-(e)CA case Basically, in an average down-link latency calculation, latency is calculated according to the following procedure.

Following the same approach as in section B.2.1 in 3GPP TR 36.912, the LTE U-plane one-way latency for a scheduled UE consists of the fixed node processing delays and 1 TTI duration for transmission, as shown in FIG. 1. Assuming the processing times can be scaled by the same factor of TTI reduction keeping the same number of HARQ processes, the one way latency can be calculated as $D = 1.5$ TTI (eNB processing and scheduling)+1 TTI (transmission)+1.5 TTI (UE processing)+$n*8$ TTI (HARQ retransmissions)

$= (4+n*8)$TTI.

Considering a typical case where there would be 0 or 1 retransmission, and assuming error probability of the first transmission to be p, the delay is given by $D = (4+p*8)$TTI.

So, for 0% BLER, D=4*TTI,

And for 10% BLER, D=4.8*TTI.

Average UE Initiated UL Transmission Latency Calculation

Assume UE is in connected/synchronized mode and wants to do UL transmission, e.g., to send TCP ACK. Following table shows the steps and their corresponding contribution to the UL transmission latency. To be consistent in comparison of DL and UL, we add the eNB processing delay in the UL after the UL data is received by the eNB (step 7).

TABLE 1

Table A.1 UL transmission latency calculation

| Step | Description | Delay |
|---|---|---|
| 1. | Average delay to next SR opportunity | SR periodicity/2 |
| 2. | UE sends SR | 1 TTI |
| 3. | eNB decodes SR end generates scheduling grant | 3 TTI |
| 4. | Transmission of scheduling grant (assumed always error free) | 1 TTI |
| 5. | UE processing delay (decoding Scheduling grant + L1 encoding of data) | 3 TTI |
| 6. | UE sends UL transmission | (1 + p*8) TTI where p is initial BLER. |
| 7. | eNB receives and decodes the UL data | 1.5 TTI |

In the table above, steps 1-4 and half delay of step 5 is assumed to be due to SR, and rest is assumed for UL data transmission in values shown in Table 4

Resource Mapping of Short TTI [3]

Figure 2:
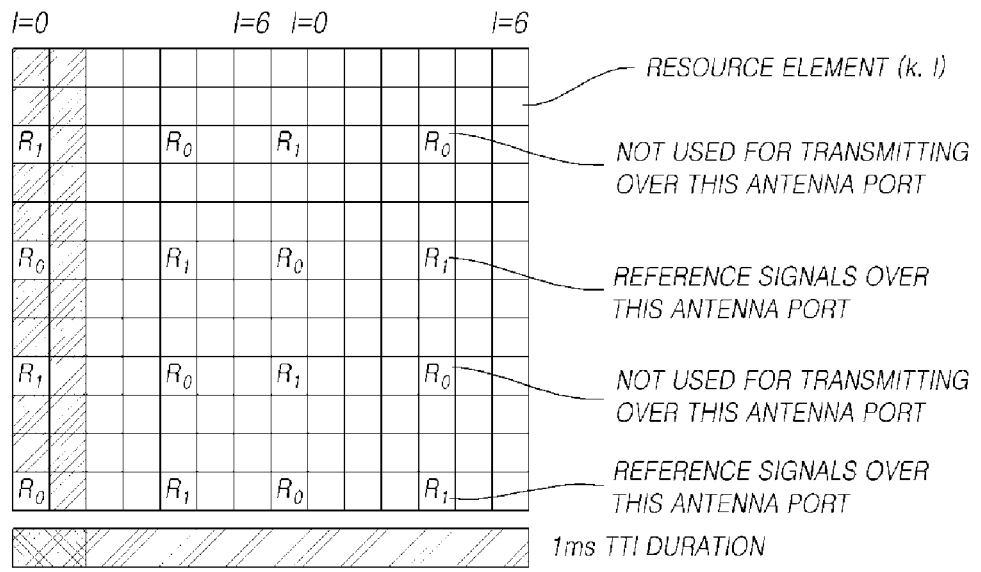
FIG. 2 is a diagram illustrating resource mapping per PRB in one subframe.
Figure 2:
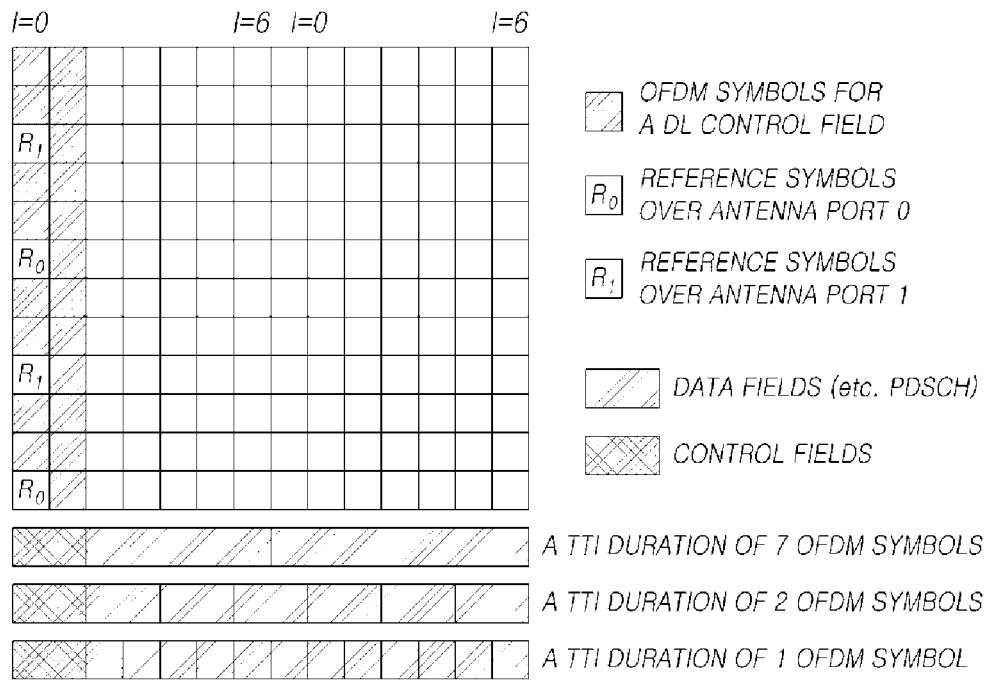

In FIG. 2 the resource map above is the legacy resource mapping per PRB in one subframe, considering 2 Antenna ports and 2 OFDM symbols control field. In FIG. 2 the resource map below is the short TTI resource mapping, considering 2 OFDM symbols used for the control field in order to ensure the backward compatibility. The loss rates (Legacy, e.g. 5%-50%) of the PHY layer in short TTI duration are assumed.

TBS Calculation of Short TTI

According to the resource mapping and the TBS calculation formula given above, the loss rate of PHY layer for legacy PDSCH is calculated as follows:

$$L_{legacy} = \frac{\text{the number of reference symbols within } PDSCH}{\text{the number of } REs \text{ within } PDSCH} = \frac{12}{144} = 8.3\%$$

For different short TTI duration, The TBS of short TTI PDSCH is calculated as the following table:

TABLE 2

Table A1.6-2: TBS calculation for different TTI duration

| TTI Duration | TBS of short TTI PDSCH (TBSshort) |
|---|---|
| 7 OFDM symbol | First time slot: $TBS_{short} = TBS_{legacy} \times \frac{60}{144} \times \frac{1 - L_{short}}{1 - 8.3\%}$ <br><br> Second time slot: $TBS_{short} = TBS_{legacy} \times \frac{84}{144} \times \frac{1 - L_{short}}{1 - 8.3\%}$ |
| 2 OFDM symbol | $TBS_{short} = TBS_{legacy} \times \frac{24}{144} \times \frac{1 - L_{short}}{1 - 8.3\%}$ |
| 1 OFDM symbol | $TBS_{short} = TBS_{legacy} \times \frac{12}{144} \times \frac{1 - L_{short}}{1 - 8.3\%}$ |

[Existing PHICH]

A PHICH is a DL control channel transmitting a response to reception of a PUSCH to a UE. An eNB operates the PHICH for the purpose of transmitting Ack/Nack for an uplink data channel to the corresponding UE.

Figure 3:
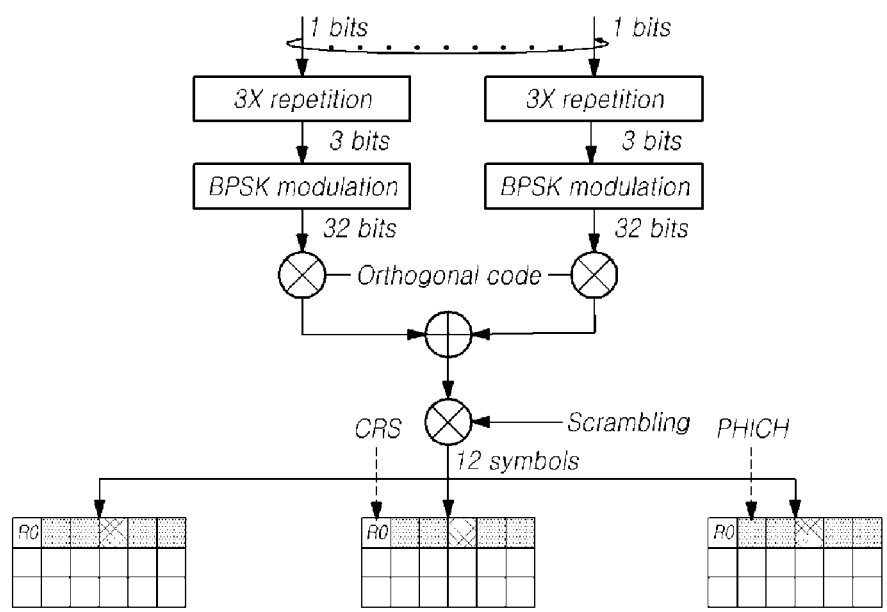
FIG. 3 is a diagram illustrating PHICH processing of a normal CP case in LTE/LTE-Advanced.

Bit information '1' or '−1' indicating Ack or Nack is spread using an orthogonal code according to the procedure of FIG. 3 and mapped to Physical 12 REs.

The PHICH resource allocated to UEs is represented by $(n_{PHICH}^{group}, n_{PHICH}^{seq})$, an orthogonal sequence in the group is referred to $n_{PHICH}^{seq}$, and a RE set through which the sequences are multiplexed is referred to $n_{PHICH}^{group}$. The PHICH is implicitly determined based on a Lowest PRB index $I_{PRB\_RA}^{lowest\_index}$ of the PUSCH and a cyclic shift value of the UL DMRS $n_{DMRS}$. A detailed description is as follows.

The PHICH resource is identified by the index pair $(n_{PHICH}^{groups}, n_{PHICH}^{seq})$ where $n_{PHICH}^{group}$ is the PHICH group number and $n_{PHICH}^{seq}$ is the orthogonal sequence index within the group as defined by:

$n_{PHICH}^{group} = (I_{PRB\_RA} + n_{DMRS}) \bmod N_{PHICH}^{group} + I_{PHICH} N_{PHICH}^{group}$ $n_{PHICH}^{seq} = (\lfloor I_{PRB\_RA}/N_{PHICH}^{group} \rfloor + n_{DMRS}) \bmod 2N_{SF}^{PHICH}$ where $n_{DMRS}$ is mapped from the cyclic shift for DMRS field (according to Table 3) in the most recent PDCCH/EPDCCH with uplink DCI format [4] for the transport block(s) associated with the corresponding PUSCH transmission. $n_{DMRS}$ shall be set to zero, if there is no PDCCH/EPDCCH with uplink DCI format for the same transport block, and if the initial PUSCH for the same transport block is semi-persistently scheduled, or if the initial PUSCH for the same transport block is scheduled by the random access response grant. $N_{SF}^{PHICH}$ is the spreading factor size used for PHICH modulation as described in subclause 6.9.1 in [3].

$$I_{PRB\_RA} = \begin{cases} I_{PRB\_RA}^{lowest\_index} & \text{for the first } TB \text{ of a } PUSCH \text{ with associated } PDCCH/EPDCCH \text{ or for the case of no associated } PDCCH/EPDCCH \text{ when the number of negatively acknowledged } TBs \text{ is not equal to the number of } TBs \text{ indicated in the most recent } PDCCH/EPDCCH \text{ associated with the corresponding } PUSCH \\ I_{PRB\_RA}^{lowest\_index} + 1 & \text{for a second } TB \text{ of a } PUSCH \text{ with associated } PDCCH/EPDCCH \end{cases}$$

where $I_{PRB\_RA}^{lowest\_index}$ is the lowest PRB index in the first slot of the corresponding PUSCH transmission $N_{PHICH}^{group}$ is the number of PHICH groups configured by higher layers as described in subclause 6.9 of [3], $$I_{PHICH} = \begin{cases} 1 & \text{for TDD UL/DL configuration 0 with } PUSCH \\ & \text{transmission in subframe } n = 4 \text{ or } 9 \\ 0 & \text{otherwise} \end{cases}$$

TABLE 3

Table 9.1.2-2: Mapping between $n_{DMRS}$ and the cyclic shift for DMRS field in PDCCH/EPDCCH with uplink DCI format in [4]

| Cyclic Shift for DMRS Field in PDCCH/EPDCCH with uplink DCI format in [4] | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

[Existing PHICH]

A PUCCH is a UL control channel transmitting a response to reception of a PDSCH by a UE to an eNB. The UE uses various formats of a PUCCH to transmit Ack/Nack and CQI information for a downlink data channel to the eNB.

Figure 4:
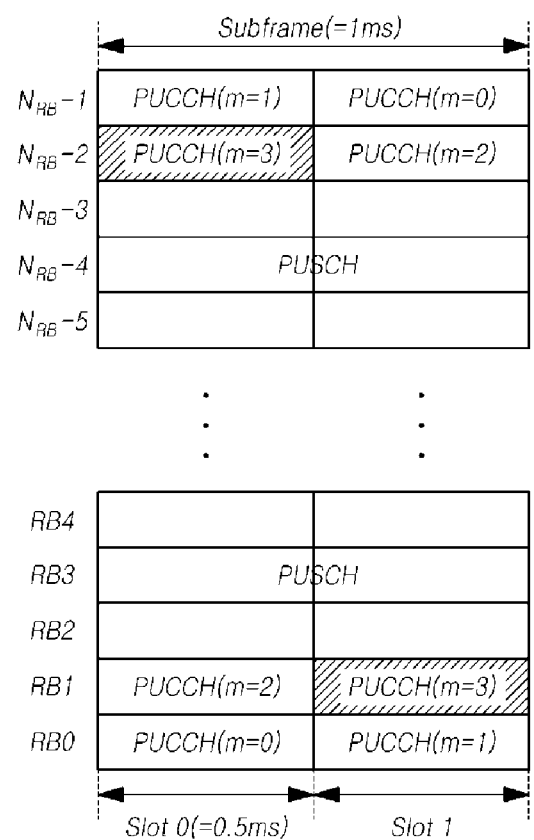
FIG. 4 is a diagram illustrating a legacy PUCCH uplink structure.

Slot-based PUCCH hopping is performed in the typical LTE/LTE-Advanced frame structure (TTI=1 ms=14 OFDM symbols), as shown in FIG. 4. Such PUSCH hopping increases the frequency diversity of the PUCCH and as a result increases the coverage of the PUCCH. This is because basically the same signal or one information sequence is transmitted through different frequency bands from one another, and therefore there is a gain that can obtain diversity.

Figure 5:
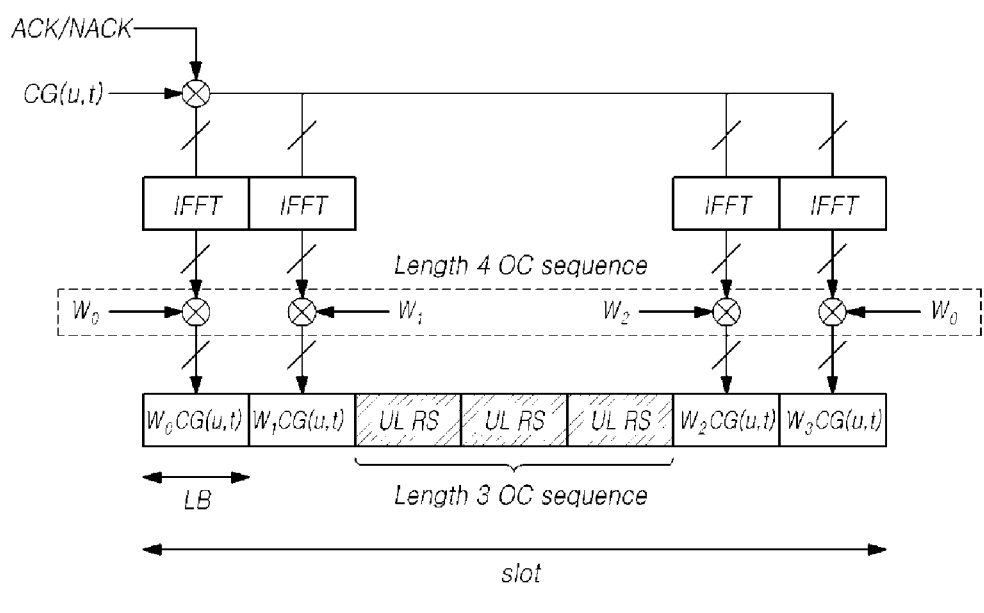
FIG. 5 is a conceptual diagram illustrating a legacy PUCCH configuration.

Resource allocation for transmitting Ack/Nack through the typical PUCCH is applied with OCC (spreading)+CS (cyclic shift) based on format 1a and 1b. As shown in FIG. 5, the typical PUCCH is configured with 3 RS symbols and 4 Ack/Nack symbols on a slot basis.

In the present disclosure, proposed is a CS-based Ack/Nack multiplexing resource allocation of a Zadoff-Chu (ZC) sequence except for a typical OCC considering that the number of symbols of an sPUCCH is reduced. Unlike the typical structure, OCC spreading is not used in this case.

The ZC sequence is basically defined by the cyclic shift $\alpha$ value defined in RS $r_{u,v}^{(\alpha)}(n)$ below (see TS 36.211).

$$r_{u,v}^{(\alpha)}(n) = e^{j\alpha n} \bar{r}_{u,v}(n), 0 \le n < M_{sc}^{RS}$$

In this disclosure, the following basic structure is assumed to configure an sPUCCH Ack/Nack without using the OCC.

In this case, dynamic resource allocation is performed for PUCCH format 1a/b, and basically the following dynamic allocation is performed based on a CCE index of a scheduled PDCCH.

$$n_{PUCCH}^{(1,\tilde{p}0)} = n_{CCE} + N_{PUCCH}^{(1)}$$

In this case, a PUCCH resource index $n_{PUCCH}^{(1,\tilde{p})}$ for Ack/Nack is determined by a lowest CCE index $n_{CCE}$ of a PDCCH used for DCI transmission used to DL resource allocation and $N_{PUCCH}^{(1)}$ transmitted from a higher layer. In this case, $N_{PUCCH}^{(1)}$ denotes a kind of shift value set to separate the PUCCH format 1a/1b from other PUCCH format 2/3/4 etc.

Until recently, the work scope related to the shortened TTI Work item and further agreement reached in the 3GPP RAN WG1 #86 meeting are as follows.

For Frame structure type 1: [RAN1, RAN2, RAN4]
Specify support for a transmission duration based on 2-symbol sTTI and 1-slot sTTI for sPDSCH/sPDCCH
Specify support for a transmission duration based on 2-symbol sTTI, 4-symbol sTTI, and 1-slot sTTI for sPUCCH/sPUSCH
Down-selection is not precluded
Study any impact on CSI feedback and processing time, and if needed, specify necessary modifications (not before RAN1 #86bis)
Agreements:
For FS1,2&3, a minimum timing n+3 is supported for UL grant to UL data and for DL data to DL HARQ for UEs capable of operating with reduced processing time with only the following conditions:
A maximum TA is reduced to x ms, where x<=0.33 ms (exact value FFS);
At least when scheduled by PDCCH
For FS2, new DL HARQ and UL scheduling timing relations will be defined
Details FFS
FFS:
Possible minimum timing of n+2 TTI
FFS max TA in this case
FFS what other restrictions (if any) on when reduced processing times of n+2 could be applied
Possibility of scheduling by EPDCCH.
Agreements:
Reduced processing time(s) are RRC configured for the UE
Working assumption: A mechanism for dynamic fallback to legacy processing timings (n+4) is supported
Details FFS
Working assumption can be revisited if it is not found to be feasible.

As described, studies on physical layers associated with the short TTI have been in progress, and a specific method associated with Ack/Nack transmission for sPDSCH reception has not been proposed.

In the present disclosure, an Ack/Nack linkage establishment method and a specific operation method of a sPUCCH for an sPDSCH (short TTI based PUSCH) are proposed.

Unlike the typical LTE/LTE-Advanced frame structure (TTI=1 ms=14 OFDM symbols), a short TTI may be made up of a set of 2, 4, or 7 symbols.

At this time, the configuration of a sPUCCH that transfers Ack/Nack feedback for an sPDSCH based on a short TTI frame structure should be different from the typical one. This is because the typical PUCCH is determined based on 14 OFDM symbols, and therefore the typical Ack/Nack multiplexing scheme cannot be applied to a sTTI-based sPUCCH, which is determined based on smaller symbols than the typical PUCCH.

Specifically, the number of UL/DL short TTI symbols is defined as follows based on the work scope.

sPDSCH/sPDCCH: 2-symbol sTTI and 1-slot sTTI
sPUCCH/sPUSCH: 2-symbol sTTI, 4-symbol sTTI, and 1-slot sTTI That is, the number of symbols in a frame for transmitting the sPDSCH/sPDCCH may be different from or identical to the number of the symbols in a frame for transmitting the sPUCCH/sPUSCH.

Therefore, the number of symbols in a frame for sPUCCH for transmitting Ack/Nack for sPDSCH transmission may be different from or identical to the number of symbols in a frame for transmitting the sPDSCH.

Figure 6:
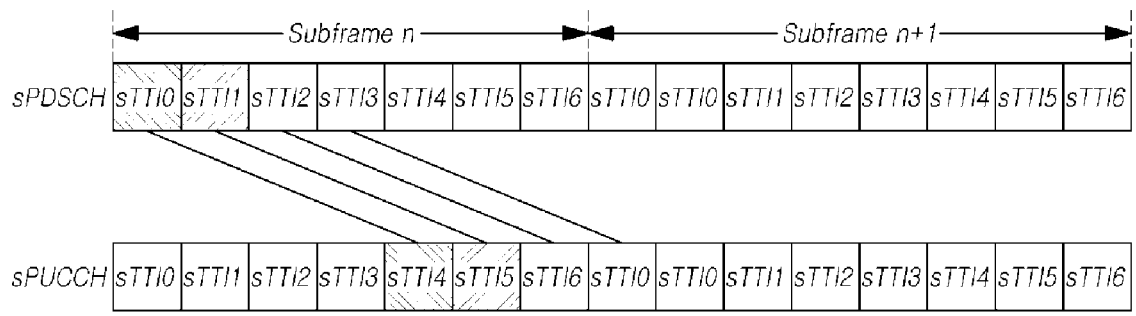
FIG. 6 is a diagram illustrating establishing a linkage between an sPDSCH and an sPUCCH based on an sTTI frame structure of the same symbol length.
Figure 7:
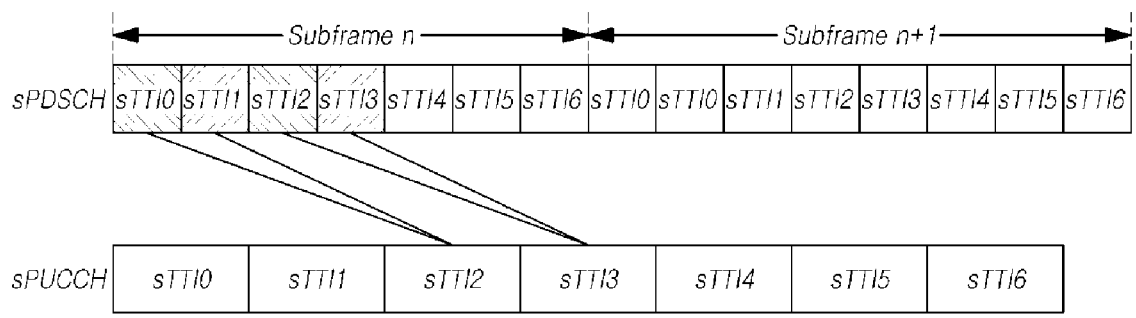
FIG. 7 is a diagram illustrating establishing a linkage between an sPDSCH and an sPUCCH based on sTTI frame structures to which symbol lengths different from each other are applied.

FIG. 6 shows a same sTTI structure for transmitting an sPDSCH and for transmitting an sPUCCH, and FIG. 7 shows different sTTI structures for transmitting the sPDSCH and for transmitting the sPUCCH.

Basically, in case of the same sTTI structure for the sPDSCH and corresponding sPUCCH, a linkage between the sPDSCH and the sPUCCH may be established as shown in FIG. 6.

On the contrary, in case of the different sTTI structure for the sPDSCH and corresponding sPUCCH, a linkage between the sPDSCH and the sPUCCH may be established as shown in FIG. 7.

Thus, when sTTIs having different lengths between DL and UL are defined, Ack/Nack resources for the sPDSCH overlap over one sPUCCH.

For example, when an sTTI for transmitting an sPDSCH is made up of two symbols, and an sTTI for transmitting an sPUCCH for transmitting Ack/Nack for the sPDSCH is transmitted is made up of four symbols, as shown in FIG. 7, there may occur a situation where resources through which the sPUCCH is transmitted overlap.

In such a sTTI frame structure, when allocating resources for transmitting Ack/Nack for the sPDSCH, if the sPUCCH is designed to have a structure for reusing a resource allocation principle of the legacy PUCCH transmitting the Ack/Nack, the following PUCCH assignment rule should be utilized.

$$n_{PUCCH}^{(1,\tilde{p}0)} = n_{CCE} + N_{PUCCH}^{(1)}$$

$n_{CCE}$: The lowest CCE index of a PDCCH used for DCI transmission used for DL resource allocation $N_{PUCCH}^{(1)}$: A shift value transmitted from a higher layer Basically, it is assumed that the sPDCCH may be transmitted for each sTTI. In this case, since it is assumed that the sTTI is configured with a limited symbol length and a limited frequency band in comparison with the typical legacy TTI, a UE performing consecutive sPDSCH reception can use the same resource allocation index, and therefore a conflict between sPUCCH resources may occur. That is, in some situations, the lowest CCE index $n_{CCE}$ of the sPDCCH may be overlapped.

Here, since the shift value such as $N_{PUCCH}^{(1)}$ is a cell-specific value, all UEs in a cell have the same value (RRC message). Therefore, in order to prevent a conflict in the resource allocation for the sPUCCH, an additional shift value should be set in addition to the $n_{CCE}$.

In accordance with embodiments of the present disclosure, provided area method for establishing linkage between an sPDSCH and an sPUCCH for Ack/Nack transmission, and a method for preventing a conflict when an sPUCCH resource is allocated.

Embodiment 1. Allocate a Resource for an sPUCCH Using a DL sTTI Index Through which an sPDSCH is Transmitted In the embodiments of the present disclosure, a typical PUCCH resource allocation method is reused. However, the embodiments of the present disclosure may be identically applied to another method. First, a method proposed based on a PUCCH resource allocation function described above may use the following modified function.

$$n_{PUCCH}^{(1,\tilde{p}0)} = n_{CCE} + N_{PUCCH}^{(1)} + X_{offset}$$

Here, "$X_{offset}$" is an offset or a shift value for solving a problem in which sPDSCHs transmitted in different sTTI periods conflict with each other in a single sPUCCH.

In the proposed method, a corresponding value is based on an index of an sTTI for transmitting an sPDSCH. Therefore, even if the lowest CCE index $n_{CCE}$ of the sPDCCH is the same, sPUCCH resources do not conflict with each other when the Ack/Nack of each sPDSCH is transmitted.

For example, the following table can be used.

TABLE 4

| Example of sPUCCH resource offset values | | |
|---|---|---|
| DL sTTI index | Ex-1: Offset value ($X_{offset}$) | Ex-2: Offset value ($X_{offset}$) |
| 0 | 0 | 0 |
| 1 | 1 | 2 |
| 2 | 2 | 4 |
| 3 | 3 | 6 |
| ... | ... | ... |

The $X_{offset}$ may be applied by using various patterns, and it is possible to predefine and interwork patterns according to an index change of a DL sTTI.

Consequently, through the proposed method, sPDSCHs transmitted from different sTTIs may transmit Ack/Nack to an eNB without conflicting over the same sPUCCH.

For example, it is assumed that sPDSCH #0 and sPDSCH #1 are transmitted to UE #0 and UE #1 using DL sTTI index #0 and #1 of Table 4, respectively. At this time, it is assumed that the lowest CCE index which may be identified when each sPDCCH is detected is $n_{CCE}=0$.

Through the proposed method, the following sPUCCH resource allocation is performed for each resource. Consequently, sPUCCH resource indexes used by the UE #0 and the UE #1 are different, so that no conflict occurs.

$$n_{PUCCH}^{(1,\tilde{p}0)} = n_{CCE} + N_{PUCCH}^{(1)} + X_{offset} = 0 + N_{PUCCH}^{(1)} + 0$$

UE #0 sPUCCH resource:

$$n_{PUCCH}^{(1,\tilde{p}0)} = n_{CCE} + N_{PUCCH}^{(1)} + X_{offset} = 0 + N_{PUCCH}^{(1)} + 1 \quad \text{UE \#1 sPUCCH resource:}$$

Embodiment 2. Define n Individual Shift Value '$X_{offset}$' for Each DL sTTI Through which an sPDSCH is Transmitted and Use it as an Additional Shift Value in Resource Allocation for an sPUCCH In the Embodiment 2, the shift value $X_{offset}$ used for sPUCCH resource allocation is determined differently for each DL sTTI.

That is, it means that an eNB determines the shift value for each sPDSCH instead of directly using a DL sTTI index as the shift value of sPUCCH resource allocation. Therefore, it is necessary for corresponding information to be transmitted to a UE. The effect of the proposed method is the same as that of Embodiment 1, and therefore, the description thereof is omitted.

Embodiment 2-1. The Shift Value '$X_{offset}$' is Transmitted to a UE Through Dynamic Signaling In this Embodiment 2-1, proposed is a method of transmitting information on sPUCCH resource allocation shift value $X_{offset}$ through dynamic signaling.

Generally, DL grant is used for dynamic signaling. Therefore, a DCI format that conveys the sPDSCH resource allocation information should contain a corresponding information field.

For example, if an sPUCCH is included in the typical DCI format, the following modifications are required.

DCI format 1As: Atypical field+an sPUCCH field
DCI format 1Bs: Atypical field+an sPUCCH field
DCI format 2As: A typical field+an sPUCCH field The added PUCCH field may be set to 'N' bits, and the value may be set to various lengths of 2, 3, 4, . . . , and soon. For example, if the '$X_{offset}$' is set to 2 bits, Ack/Nack of a total of 4 sPDSCHs can be allocated to sPUCCH without conflict.

In addition, since it is dynamic signaling, it is possible to perform 1:1 signaling for sPDSCH for each sTTI.

Embodiment 2-2. The Shift Value '$X_{offset}$' is Transmitted to a UE Through RRC Signaling (or Higher Layer Signaling)

The principle of this proposal has the same effect as the dynamic signaling described above, except that shift values for several sPDSCHs are transmitted at once through the RRC signaling.

Multiples of the typical subframe period may be best as a period in which the RRC signaling is performed, but is not limited thereto.

For example, if M DL sTTIs are configured in a 1 ms legacy subframe, the sPUCCH shift values of M sTTIs are transmitted at once. In addition, when RRC signaling is not performed, basically the previous sPUCCH shift value can be reused as is.

Embodiment 3. Define an Individual $N_{PUCCH}^{(1)}$ for Each DL sTTI Through which an sPDSCH is Transmitted and Use it as an Additional Shift Value in Resource Allocation for an sPUCCH The basic principle of this Embodiment 3 is the same as Embodiment 2, except that $N_{PUCCH}^{(1)}$ transmitted through RRC signaling is changed for each sTTI.

This method thus requires additional RRC information generation for the sTTI, for example an additional RRC message generation such as sPUCCH_Config (TS 36.331 standard).

Therefore, in the proposed method, sPUCCH shift values transferred to each sTTI may be changed as shown in the following table.

TABLE 5

Example of sPUCCH resource offset values for Embodiment 3

| DL sTTI index | sPUCCH shift parameter | sPUCCH shift value |
|---|---|---|
| 0 | $N_{sPUCCH,0}^{(1)}$ | 1 |
| 1 | $N_{sPUCCH,1}^{(1)}$ | 2 |
| 2 | $N_{sPUCCH,2}^{(1)}$ | 3 |
| 3 | $N_{sPUCCH,3}^{(1)}$ | 4 |
| ... | ... | ... |

For example, it is assumed that sPDSCH #0 and sPDSCH #1 are transmitted to UE #0 and UE #1 using DL sTTI index #0 and #1 of Table 5, respectively.

At this time, it is assumed that the lowest CCE index which can be identified when each sPDCCH is detected $n_{CCE}=0$.

Consequently, sPUCCH resource indexes used by the UE #0 and the UE #1 are different, so that no conflict occurs.

$$n_{PUCCH}^{(1,\tilde{p}0)} = n_{CCE} + N_{PUCCH}^{(1)} \rightarrow n_{CCE} + N_{sPUCCH,0}^{(1)} = 0+1 \quad \text{UE \#0 sPUCCH resource:}$$

$$n_{PUCCH}^{(1,\tilde{p}0)} = n_{CCE} + N_{PUCCH}^{(1)} \rightarrow n_{CCE} + N_{sPUCCH,1}^{(1)} = 0+2 \quad \text{UE \#1 sPUCCH resource:}$$

The present disclosure proposes an sPUCCH Ack/Nack feedback method for an sTTI-based sPDSCH. A specific method of providing Ack/Nack feedback of an sTTI-based sPUCCH is described, and its principle may be applied to similar signals and channels as is and therefore is not limited to the new frame structure.

Figure 8:
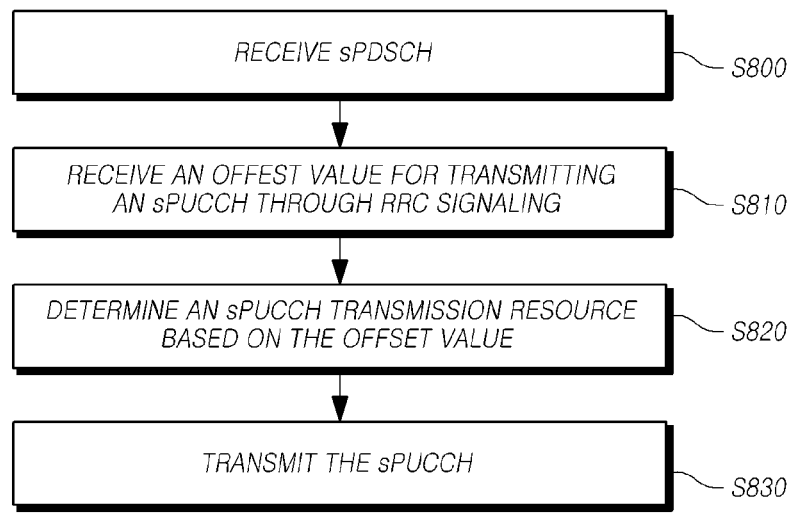
FIG. 8 is a flowchart illustrating a method of transmitting an sPUCCH in an sTTI frame structure according to at least one embodiment of the present disclosure.

FIG. 8 illustrating a method of transmitting an sPUCCH in an sTTI frame structure according to at least one embodiment of the present disclosure.

Referring to FIG. 8, a UE receives a DL data channel (sPDSCH) in an sTTI frame structure from a base station (S800).

The sTTI frame through which the sPDSCH is received may be a frame made up of 2, 4, or 7 symbols.

The UE receives an offset value for establishing an sPUCCH link associated with the sPDSCH from the BS through higher layer signaling (S810).

Here, the sPUCCH associated with the sPDSCH may be an UL control channel for Ack/Nack transmission for sPDSCH reception.

The UE receives an offset value required for configuring an sPUCCH for the Ack/Nack transmission for the sPDSCH reception through higher layer signaling, for example, RRC signaling.

The offset value received by the UE through the higher layer signaling is an offset value set for each sPDSCH transmitted by the BS and may be an offset value set for sPUCCH resource allocation for each UE.

When receiving the offset value from the BS through the higher layer signaling, the UE configures a resource for the sPUCCH transmission using the offset value (S820). Then, the BS transmits the sPUCCH for sPDSCH reception to the BS through the configured resource (S830).

Therefore, according to the present embodiments, provided are specific techniques for establishing the sPUCCH link for Ack/Nack transmission for the sPDSCH in the sTTI frame structure. In addition, by transmitting the offset value set for each UE through the higher layer signaling, conflict between the sPUCCH transmission resources is prevented even when a DL sTTI frame structure and an UL sTTI frame structure are different.

Figure 9:
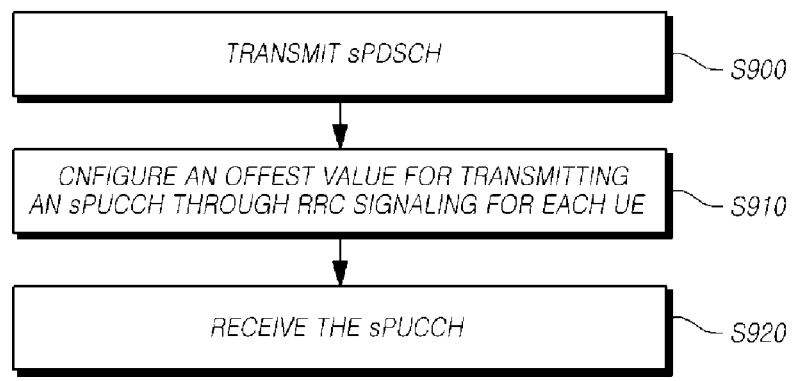
FIG. 9 is a flowchart illustrating a method of receiving an sPUCCH in an sTTI frame structure according to at least one embodiment of the present disclosure.

FIG. 9 illustrating a method of allocating sPUCCH transmission resources and receiving an sPUCCH in an sTTI frame structure according to at least one embodiment of the present disclosure.

Referring to FIG. 9, a BS transmits an sPDSCH to a UE in an sTTI frame structure (S900).

The BS transmits an offset value used for an sPUCCH resource configuration for Ack/Nack reception for the sPDSCH to the UE through higher layer signaling (e.g., RRC signaling) (S910).

That is, the BS sets the offset value for sPUCCH resource allocation for each UE receiving the sPDSCH and transmits the set offset value to the UE. Accordingly, the UE may perform sPUCCH resource allocation for Ack/Nack transmission for the sPDSCH reception using the offset value set for each UE received from the BS.

The UE transmits the sPUCCH through resource(s) set using the offset value received from the BS, and the BS receives the sPUCCH for the sPDSCH (S920).

Therefore, according to the present embodiments, the BS transmits the offset value for the sPUCCH configuration for each UE through higher layer signaling, so that the UE may establish an sPUCCH link for the sPDSCH.

In addition, since sPUCCH resources are configured using the offset values set for each UE through the higher layer signaling, conflict between the sPUCCH resources is prevented even when a DL sTTI frame structure and an UL sTTI frame structure are different.

Figure 10:
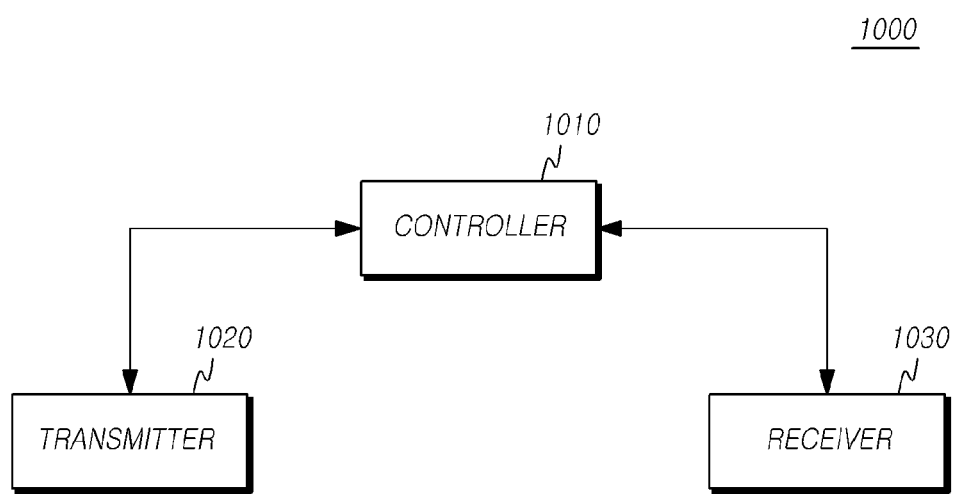
FIG. 10 is a block diagram illustrating a base station according to at least one embodiment of the present disclosure.

FIG. 10 is a block diagram illustrating a BS according to at least one embodiment of the present disclosure.

Referring to FIG. 10, a BS 1000 according to embodiments of the present disclosure includes a controller 1010, a transmitter 1020, and a receiver 1030.

The controller 1010 is configured to control the overall operations of the BS 1000 for configuring an Ack/Nack linkage related to an sPDSCH in a short TTI frame structure according to the present disclosure described above.

The controller 1010 transmits a UE-specific offset value used for configuring an sPUCCH transmission resource(s) for Ack/Nack transmission for the sPDSCH to a UE through higher layer signaling (e.g., RRC signaling) (S910).

Thus, the UE may establish an sPUCCH link for the Ack/Nack transmission for sPDSCH reception.

The transmitter 1020 and the receiver 1030 are used to transmit/receive signals, messages, and data necessary for carrying out the present disclosure described above, to/from the UE.

Figure 11:
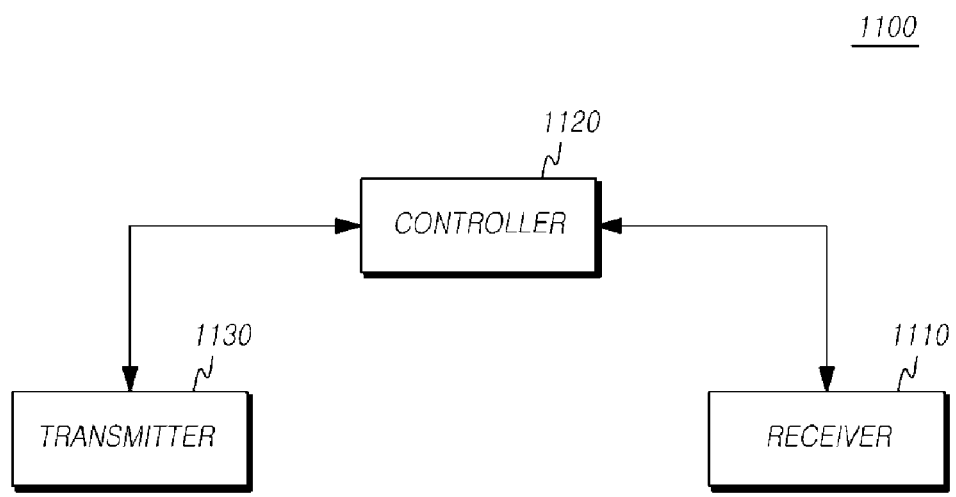
FIG. 11 is a block diagram illustrating a user equipment according to at least one embodiment of the present disclosure.

FIG. 11 is a block diagram illustrating a UE according to at least one embodiment of the present disclosure.

Referring to FIG. 11, a UE 1100 according to embodiments of the present disclosure includes a receiver 1110, a controller 1120, and a transmitter 1130.

The receiver 1110 is configured to receive DL control information, data, and messages through a corresponding channel from a BS.

The controller 1120 is configured to control the overall operations of the UE 1100 for configuring an Ack/Nack linkage related to an sPDSCH in a short TTI frame structure according to the present disclosure described above.

Specifically, the controller 1120 is configured to identify an offset value for an sPUCCH transmission resource configuration received from the BS through the higher layer signal. Then, the controller 1120 configures a resource for Ack/Nack transmission for sPDSCH reception based on the offset value and transmits the sPUCCH through the corresponding resource.

Since sPUCCH transmission resources are configured using the offset values set for each UE, conflict between the sPUCCH transmission resources is prevented even when a DL sTTI frame structure and an UL sTTI frame structure are different from each other.

The transmitter 1130 is configured to transmit UL control information and data, messages to the BS through a corresponding channel.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

APPENDIX

[1] Ericsson, Huawei, "New SI proposal Study on Latency reduction techniques for LTE", RP-150465, Shanghai, China, Mar. 9-12, 2015.
[2] R2-155008, "TR 36.881 v0.4.0 on Study on Latency reduction techniques for LTE", Ericsson (Rapporteur)
[3] R1-160927, "TR 36.881-v0.5.0 on Study on Latency reduction techniques for LTE", Ericsson (Rapporteur)

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of transmitting a short uplink physical control channel (sPUCCH), the method comprising:
   receiving a downlink data channel from a base station;
   receiving an user equipment (UE)-specific offset value to transmit the sPUCCH for the downlink data channel through higher layer signaling; and
   transmitting the sPUCCH including ACK/NACK information for the downlink data channel through a resource determined based on the UE-specific offset value,
   wherein a 2-bit value of a sPUCCH field is included in a downlink control information (DCI) for determining the resource to transmit the sPUCCH for the downlink data channel.

2. The method according to claim 1,
   wherein the higher layer signaling comprises a radio resource control message.

3. The method according to claim 1, wherein a time interval for transmitting the downlink data channel is different from a time interval for transmitting the uplink control channel.

4. A method of receiving a short uplink physical control channel (sPUCCH), the method comprising:
- transmitting a downlink data channel to a user equipment;
- transmitting an user equipment (UE)-specific offset value to receive the sPUCCH for the downlink data channel through higher layer signaling; and
- receiving the sPUCCH including ACK/NACK information for the downlink data channel through a resource determined based on the UE-specific offset value,
- wherein a 2-bit value of a sPUCCH field is included in a downlink control information (DCI) for determining the resource to receive the sPUCCH for the downlink data channel.

5. The method according to claim 4, wherein the higher layer signaling comprises a radio resource control message.

6. The method according to claim 4,
- wherein a time interval for transmitting the downlink data channel is different from a time interval for transmitting the uplink control channel.

7. A user equipment for transmitting a short uplink physical control channel (sPUCCH), the user equipment comprising:
- a receiver configured to receive a downlink data channel from a base station and receive an user equipment (UE)-specific offset value to transmit the uplink control channel for the downlink data channel through higher layer signaling; and
- a controller configured to determine a resource for transmitting the sPUCCH based on the offset value and transmit the sPUCCH,
- wherein a 2-bit value of a sPUCCH field is included in a downlink control information (DCI) for determining the resource to transmit the sPUCCH for the downlink data channel.

8. The user equipment according to claim 7,
- wherein the higher layer signaling comprises a radio resource control message.

9. The user equipment according to claim 7,
- wherein the a time interval for transmitting the downlink data channel is different from a time interval for transmitting the uplink control channel.

* * * * *